US011897486B1

(12) United States Patent
Adams et al.

(10) Patent No.: US 11,897,486 B1
(45) Date of Patent: Feb. 13, 2024

(54) SENSOR CONSENSUS MONITOR

(71) Applicant: Zoox, Inc., Foster City, CA (US)

(72) Inventors: Derek Adams, Pasadena, CA (US);
Eric Andre Senant, Berkeley, CA (US); Weihung Ko, Sunnyvale, CA (US); Michael Carsten Bosse, Templeton, CA (US)

(73) Assignee: ZOOX, INC., Foster City, CA (US)

( * ) Notice: Subject to any disclaimer, the term of this patent is extended or adjusted under 35 U.S.C. 154(b) by 103 days.

(21) Appl. No.: 17/536,940

(22) Filed: Nov. 29, 2021

(51) Int. Cl.
| | |
|---|---|
| *G01C 21/00* | (2006.01) |
| *B60W 50/00* | (2006.01) |
| *G01C 21/16* | (2006.01) |
| *B60W 60/00* | (2020.01) |

(52) U.S. Cl.
CPC ...... *B60W 50/0098* (2013.01); *B60W 60/001* (2020.02); *G01C 21/165* (2013.01); *G01C 21/183* (2020.08); *B60W 2050/0055* (2013.01); *B60W 2050/0056* (2013.01); *B60W 2050/0085* (2013.01)

(58) Field of Classification Search
None
See application file for complete search history.

(56) References Cited

U.S. PATENT DOCUMENTS

| | | | | |
|---|---|---|---|---|
| 6,522,992 B1* | 2/2003 | McCall | ............... | G01C 21/183 |
| | | | | 701/4 |
| 10,168,352 B2* | 1/2019 | Wang | ................... | G01P 15/14 |
| 2005/0222743 A1* | 10/2005 | Otsuka | ................ | G01C 19/56 |
| | | | | 701/30.3 |
| 2006/0138988 A1* | 6/2006 | Kaneko | ............... | B62D 57/032 |
| | | | | 318/560 |
| 2012/0143399 A1* | 6/2012 | Noumura | .............. | B60W 30/02 |
| | | | | 701/1 |
| 2016/0215475 A1* | 7/2016 | Meguriya | ............. | E02F 9/2285 |
| 2019/0391587 A1* | 12/2019 | Uvarov | .................... | G06N 3/04 |

OTHER PUBLICATIONS

Wang, an Anomaly Clock Detection Algorithm for a Robust Clock Ensemble, Conference: 41st Annual Precise Time and Time Interval, Nov. 2009.

* cited by examiner

*Primary Examiner* — James M McPherson
(74) *Attorney, Agent, or Firm* — Lee & Hayes P.C.

(57) ABSTRACT

Techniques described are related to determining when a discrepancy between data of multiple sensors (e.g., IMUs) might be attributable to a sensor error, as opposed to operating conditions, such as sensor bias or noise. For example, the sensor data is passed through one or more filters (e.g., bandpass filter) that model the bias or noise, and the filtered data may then be compared for consistency. In some examples, consistency may be based on residuals or some other metric describing discrepancy among the filtered sensor data.

20 Claims, 4 Drawing Sheets

SENSOR CONSENSUS MONITOR

BACKGROUND

A vehicle may include various sensors, which may be used for many different purposes. For example, sensors can be used to detect conditions of the environment surrounding the vehicle (e.g., other vehicles, roadway conditions, pedestrians, street signs, etc.), as well as conditions/states associated with the vehicle (e.g., braking, accelerating, steering, system(s) status, relative vehicle position, global vehicle position, etc.). In some instances, multiple sensors of a similar type can be associated with a vehicle. For example, multiple inertial measurement units (IMUs) can be associated with a vehicle and can measure similar variables (e.g., motion of the vehicle). Multiple sensors may afford various benefits, such as redundancy (e.g., backup if one sensor fails) and mechanisms for error detection (e.g., detecting an error where a discrepancy exists between data from different sensors), which can be important elements in achieving a safety rating. In some instances, discrepancy between multiple sensors may not be indicative of an actual error, and instead, may be caused by normal operating conditions. It can be challenging to determine when a discrepancy should be attributed to an error, and false errors can lead to unnecessary sensor and vehicle downtime and processing delays and inefficiencies.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
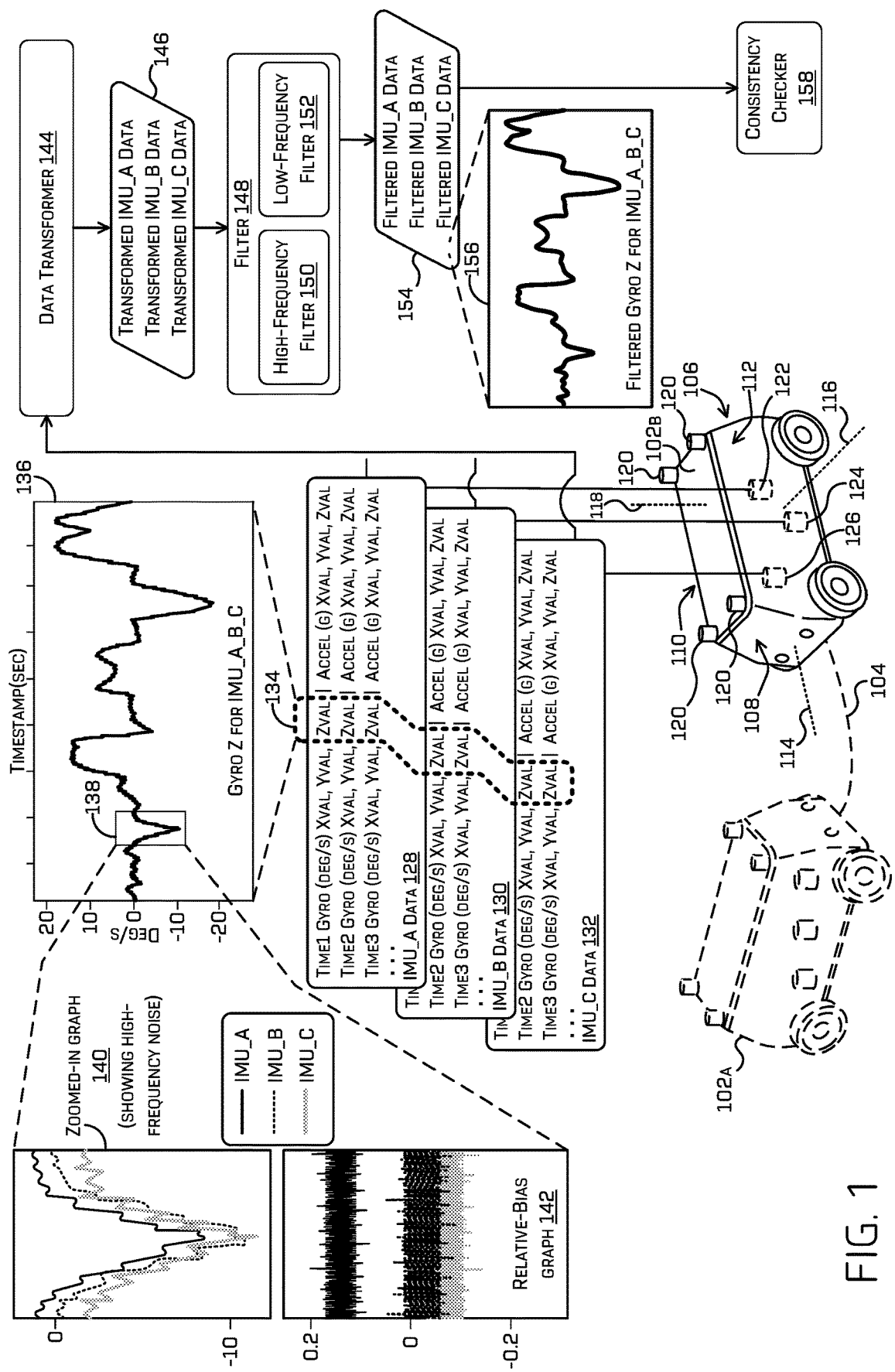
FIG. 1 illustrates an example vehicle with multiple IMUs generating various data, in accordance with examples of this disclosure.

As discussed above, a vehicle may include multiple sensors of a similar type (e.g., multiple inertial measurement units (IMUs)), such as for redundancy, error detection, etc. The present disclosure is related to techniques for determining when a discrepancy between data of multiple sensors might be attributable to a sensor error, as opposed to normal operating conditions, such as sensor bias or noise. In examples of the present disclosure, IMU data (e.g., raw IMU data) from the multiple IMUs is passed through a filter (e.g., low-pass filter, high-pass filter, bandpass filter, etc.) to remove values that might be associated with sensor bias and/or noise. The filtered IMU data from the IMUs may then be compared for consistency, and discrepancies can be analyzed to detect an IMU sensor error. In examples, by modeling the sensor noise and bias with filter parameters, techniques described in this disclosure may detect errors in a manner conductive to satisfying safety considerations. For instance, error detection may be more accurate, since at least some data associated with noise and/or bias has been filtered out. In addition, by detecting errors based on the IMU data and without needing other vehicle systems (e.g., global pose determiner) to determine absolute or relative bias, examples of this disclosure may use safety-rated IMUs without needing to account for safety of other systems.

In examples of this disclosure, systems (e.g., associated with vehicles) may have multiple sensors configured to determine similar information. For example, a vehicle may have multiple gyroscopes, accelerometers, magnetometers, IMUs, pressure sensors, other Micro Electro-Mechanical Systems (MEMS) sensors, and the like configured to detect motion, forces, angular rate, and the like associated with the vehicle. In some examples, a vehicle may include multiple sensors configured to measure a same variable, and the vehicle may use the output of only one of the sensors for downstream components. Having multiple sensors configured to measure a same variable may afford various benefits, such as error detection and redundancy (e.g., backup), should one of the sensors fail. In some examples, satisfying safety guidelines (e.g., safety ratings and/or certifications) may include providing for error/fault detection and redundancy. That is, some sensors (e.g., IMUs) may be associated with safety-critical operations (e.g., localization, trajectory planning, etc.), and as such, effective redundancy and error detection may be needed to comply with safety ratings.

Error detection may include various techniques, and in some examples, sensor data from multiple sensors is compared to assess variability. Larger variability (e.g., less consistency or consensus) among the sensor data often suggests some error or fault among the sensors, whereas smaller variability (e.g., more consistency or consensus) may suggest absence of an error or fault. Typically, sensor data is intended to represent a detected signal, and often the sensor data also reflects sensor noise and sensor bias (e.g., in addition to the actual signal). As such, absent examples of the present disclosure, it may be challenging to determine when discrepancies among sensor data is attributable to sensor noise and/or bias or to differences in the actual signal.

Examples of the present disclosure include filtering sensor data (e.g., from multiple sensors) over time to reduce the noise and bias and comparing the filtered sensor data to assess variability. For example, a low-pass filter, high-pass filter, bandpass filter, etc. may be used to remove high-frequency noise and low-frequency bias. Once filtered, the sensor data may more accurately represent the actual detected signal, and as such, any discrepancy determined among the sensor data may be more likely attributable to differences in detected signal. When the discrepancy is high enough (e.g., exceeds a threshold), the discrepancy may indicate some type of error among the sensors and/or sensor data.

In some examples, the filtered sensor data may not necessarily be relied on by other vehicle systems (e.g., for localization, determining trajectories, etc.), and as such, modeling the sensor noise and bias (e.g., using the filter(s)) provides an efficient, software-based monitoring solution that need not rely on hardware other than the sensors—these solutions are well suited for monitoring consensus and error detection. In addition, meeting safety considerations may be easier and less complex, since these techniques may not have to account for the safety rating of other components/hardware external to the sensors.

The techniques described herein can be implemented in a number of ways to monitor sensor data for consensus. Examples are provided below with reference to FIGS. 1-4.

Examples are discussed in the context of autonomous vehicles; however, the methods, apparatuses, and components described herein can be applied to a variety of components (e.g., a sensor component or a robotic platform), and are not limited to autonomous vehicles. In some examples, the techniques described herein may be utilized in driver-controlled vehicles. In some examples, the techniques described herein may be used in any system (vehicular or non-vehicular) having multiple of a same type of sensor, in which it may be useful to determine whether sensor data is consistent. Furthermore, the techniques described herein can be used with real data (e.g., captured using sensor(s)), simulated data (e.g., generated by a simulator), or any combination of the two.

FIG. 1 illustrates an example vehicle with components for monitoring sensor consensus. More specifically, FIG. 1 illustrates a first instance 102a of the vehicle and a second instance 102b of the vehicle, and the first instance 102a and the second instance 102b may be collectively referred to as the vehicle 102. The first instance 102a represents the vehicle 102 at a first time prior to executing a driving maneuver 104 (represented by the dashed line), and the second instance 102b represents the vehicle 102 at a second time after executing the driving maneuver 104. Among other things, the vehicle 102 includes a front end 106, a rear end 108, a left side 110, and a right side 112. In addition, for reference in this disclosure, the vehicle 102 includes a longitudinal axis 114 (also referred to as the "x axis") extending along a front-to-back orientation (e.g., longitudinal orientation) and a lateral axis 116 (also referred to as the "y axis") extending along a side-to-side orientation (e.g., lateral orientation) and substantially perpendicular to the longitudinal axis 114. Furthermore, a vertical axis 118 (also referred to as the "z axis") may extend top-to-bottom and perpendicular to the longitudinal axis 114 and to the lateral axis 116.

In one example, the vehicle 102 is a bidirectional vehicle having a first drive module positioned in the front end 106 and a second drive module positioned in the rear end 108. As used herein, a bidirectional vehicle is one that is configured to switch between traveling in a first direction of the vehicle and a second, opposite, direction of the vehicle. In other words, there is no fixed "front" or "rear" of the vehicle 102. Rather, whichever longitudinal end of the vehicle 102 is leading at the time becomes the "front" and the trailing longitudinal end becomes the "rear." In other examples, the techniques described herein may be applied to vehicles other than bidirectional vehicles. In various instances, the wheels positioned in the front end 106 are steerable, and the wheels positioned in the rear end 108 are also steerable, such that the vehicle 102 includes four-wheel steering (e.g., including each set of wheels having the respective steering components). In other examples, the wheels positioned in the front end 106 may be steerable, and the wheels in the rear end 108 may be fixed.

In addition, the vehicle 102 may include various sensors for detecting one or more different conditions. For example, the vehicle 102 may include sensors 120, any of which may be used to detect conditions of the environment surrounding the vehicle (e.g., other vehicles, roadway conditions, pedestrians, street signs, etc.), as well as conditions/states associated with the vehicle (e.g., braking, accelerating, steering, system(s) status, relative vehicle position, global vehicle position, etc.). Any of the sensors 120 may include a perception sensor for capturing data of an environment around the vehicle 102 (e.g., lidar, camera, time-of-flight, sonar, radar, etc.). These sensors 120 may be used for various operations, such as object detection, localization, route planning, etc. Additional details of the sensors 120 are provided herein, including below with reference to FIG. 4.

In examples of the present disclosure, the vehicle 102 may include a first IMU 122 (e.g., also referred to as IMU A), a second IMU 124 (e.g., also referred to as IMU B), and a third IMU 126 (e.g., also referred to as IMU C), which may measure various forces, motion, etc. as the vehicle 102 traverses a path. The position of the IMUs 122, 124, and 126 depicted in FIG. 1 is an example, and the IMUs 122, 124, and 126 may include various other positions or locations of the vehicle 102. The IMUs may generate various data (e.g., related to force, motion, orientation, etc.), and as described herein, an IMU may include a combination of one or more accelerometers, gyroscopes, and/or magnetometers. For example, FIG. 1 depicts data 128 generated by the first IMU 122 (e.g., IMU A data 128), data 130 generated by the second IMU 124, (e.g., IMU B data 130), and data 132 generated by the third IMU 126 (e.g., IMU C data 132). In examples, the IMU data 128, 130, and 132 is a time series continuously determined during the operational state of the vehicle 102 or other systems. In examples, the IMU data 128, 130, and 132 may include angular rates (e.g., deg/s) and specific force or acceleration (e.g., g or m/s$^2$) measured relative to the x-axis 114, the y-axis 116, and the z-axis 118. In some examples, the IMU data 128, 130, and 132 may include raw IMU data or validated raw IMU data. As used in this disclosure raw IMU data may refer to data directly from the sensor without additional processing. Raw IMU data may be validated, by checking for any clearly anomalous values (e.g., outside a range), missing values, and the like.

The IMU data 128, 130, and/or 132 may be used for various purposes. In some instances, one or more downstream processes may receive and use the IMU data 128, 130, and/or 132 to make determinations about the vehicle 102. For example, downstream processes may use the IMU data 128, 130, and/or 132 to determine a relative position of the vehicle 102 as the vehicle traverses along a path. In the example of FIG. 1, based on the IMU data 128, 130, and/or 132, a downstream process may determine a position of the vehicle 102b relative to the vehicle 102a (e.g., a relative position after the maneuver 104). In some examples, downstream processes may combine relative position determination (e.g., dead reckoning with map data and/or other global position data to help determine a position of the vehicle in an environment. Based on the position of the vehicle, various other downstream components may perform additional operations, such as trajectory planning, object avoidance, and the like.

In some examples, a determination about the vehicle 102 (e.g., the relative position of the vehicle) may be based on data from one of the IMUs, such that data from the other IMUs may not be needed for the determination. Even though multiple IMUs may not be needed, based on examples of the present disclosure, multiple IMUs may provide redundancy to the vehicle 102 (e.g., backup in case one of the IMUs fails) and may allow errors in IMU data to be detected. Among other things, redundancy and error detection may increase the safety of the vehicle 102.

In examples, techniques described herein compare data from the multiple IMUs to determine whether consensus exists among the data, and in some cases, inconsistent data (e.g., lack of consensus) may suggest an error in one or more of the IMUs. Various subsequent operations may be based on the error detection, such as not relying on the IMU associated with the error (e.g., relying on one of the other non-error IMUs), compensating for the error in downstream processes, relying on different (e.g., non-IMU systems) for data, and the like. For example, in FIG. 1, gyroscope data from the three IMUs 122, 124, and 126 and indicating angular rate in the z-axis 118 is encircled (e.g., encircled data 134), and the encircled data 134 from the IMUs may be compared to determine whether consensus exists. In examples, any of the data of the IMUs may be compared to determine consensus or for other purposes.

As an illustration, FIG. 1 includes a graph 136 depicting gyro data relative to the z-axis 118 from the three IMUs 122, 124, and 126 (e.g., encircled data 134). In addition, FIG. 1 includes zoomed-in graph 140 corresponding to a graph portion 138 of the graph 136. The zoomed-in graph 140 provides a more granular representation of the data from the graph portion 138. FIG. 1 also includes a relative-bias graph 142 corresponding to the graph portion 138, and the relative-bias graph 142 may illustrate a comparison of the bias for each IMU to an average or mean. That is, "0" in the relative-bias graph 142 may represent the mean, and the representation of each of the IMUs may indicate the relative bias of each IMU compared to that mean. The bias average may be determined in various manners, such as a simple average, weighted average, average combined with a loss function (e.g., in a clustering approach), and the like.

Among other things, the zoomed-in graph 140 illustrates the high-frequency noise often present in sensor data, and the relative-bias graph 142 illustrates sensor bias (e.g., as determined or estimated by another process) that may also affect sensor data. That is, in some instances, at least some of the data (e.g., encircled data 134) based on the IMU output may not result from the actual signal (e.g., indicating the motion or force detected). In some instances, this data that includes the high-frequency noise and the low-frequency bias may be compared to assess consensus or consistency, but it may not be clear whether a discrepancy in the data is due to differences in the actual detected signal or to noise and/or bias. As such, examples of the present disclosure include filtering the IMU data 128, 130, and 132 to remove (e.g., devalue) noise and bias before performing a comparison. Among other things, filtering the IMU data 128, 130, and 132 in this manner may increase sensitivity to actual sensor error, which may reduce the likelihood that a false positive sensitive error is detected.

In some examples, sensor data from the multiple IMUs may be processed in various manners (e.g., sometimes before filtering). For example, in some instances, the IMU data 128, 130, and 132 is processed by data transformer 144, which may apply a rigid-body kinematics transformation (e.g., based on rigid body kinematics of the vehicle 102 and/or the IMUs 122, 124, 126) to the IMU data 128, 130, and 132 to transform the IMU data 128, 130, and 132 to a common position on the vehicle 102 (e.g., a centralized reference point common to the IMUs used to identify a pose of the vehicle 102). That is, the respective IMU data (e.g., IMU A data 128, IMU B data 130, and IMU C data 132) may be associated with respective IMU positions (e.g., different for each IMU), and for comparison operations, the data 128, 130, and 132 for the IMUs may be converted or transformed to a common reference point. The transformed IMU data 146 (e.g., translated, rotated, or otherwise transformed) from the multiple IMUs may then be processed by other downstream components.

Examples of the present disclosure may include other processing, as well. For example, frequencies between the IMUs 122, 124, and 126 may be different, and as such, additional processing may be performed to increase the likelihood that the data being compared is associated with a same time. That is, the frequencies may be set differently or the same frequency setting (e.g., 200 Hz) may include slight inconsistencies (e.g., IMUs outputting at slightly different rates). As such, the least common denominator among the IMU data 128, 130, and 132 may be selected and/or the data may be sampled (e.g., below the Nyquist rate) to account for differences, such as based on slight time delays.

In some examples, the present disclosure includes a filter 148 that filters the transformed IMU data 146. The filter 148 may include various types of filters, such as a high-frequency filter 150 to reduce sensor noise in the data and a low-frequency filter 152 to reduce sensor bias in the data. In some examples, the high-frequency filter 150 and the low-frequency filter 152 may be implemented as a bandpass filter. Examples of filters that may be used to perform the functionality of the high-frequency filter 150 and/or the low-frequency filter 152 include exponential filters (e.g., exponential smoothing), finite impulse response (FIR) filters, infinite impulse response (IIR) filters, exponential decay filters, and the like. In examples, filters (e.g., the parameters of the filters) are used to model the high-frequency noise and the low-frequency bias, and as such, the filtered IMU data may better reflect the actual detected signal (e.g., the detected motion, force, angular rate, etc.), since the data associated with the noise and/or bias may be devalued.

In examples, the filter 148 may output filtered IMU data 154 associated with the IMUs 122, 124, and 126, such as filtered values associated with a gyroscope and/or accelerometer in the x-axis 114, the y-axis 116, and/or the z-axis 118. For instance, the filtered IMU data 154 may include filtered IMU A data that is sampled from the IMU A data 128, filtered IMU B data that is sampled from the IMU B data 130, and filtered IMU C data that is sampled from the IMU C data 132. As an illustration, FIG. 1 depicts a graph 156 plotting at least a portion of the filtered IMU data 154 (e.g., gyro z-axis similar to the encircled data 134). As compared to the graph 136, the data (e.g., based on the visualization provided by the graph 156) is smoother with less dynamic transitions (e.g., from one detection/time to the next detection/time).

Parameters associated with, and implementation of, the filter 148 may be optimized in various manners. For example, time delays may be inserted at various steps to tune outputs, such as by waiting a period of time (e.g., or for a quantity of data values to be received) to receive a sufficiently robust data set. Such time delays may also be introduced to account for differences in starting times for the IMUs, to account for differences in electric path lengths from the IMUs to the receiving computing system, and the like. For instance, in some examples, the filter may include an exponential filter with an optimized time constant (e.g., between about 0.5 seconds and about 1.0 seconds). In some examples, such as at startup, the high-frequency filter 150 may start filtering the high-frequency data at a time earlier in the time series than the start of filtering by the low-frequency-filter 152. That is, based on a time constant associated with the filter(s), the filter(s) may delay for a duration (e.g., 0.8 seconds) before starting to filter the low-frequency data to allow time to receive a larger sample size, which may increase the likelihood that sensor bias is accurately modeled. In some examples, a delay associated with the time constant is shorter than time duration associated with a downstream component receiving sensor data using the sensor data for a downstream process (e.g., localization, trajectory planning, etc.). As such, the delay is configured to be short enough to detect an error before potentially inaccurate data is communicated to other systems.

Consensus among the IMUs at a given time (e.g., for a given timestamp) may be determined in various ways, such as by determining a discrepancy metric or other value that quantifies the variability, deviation, differences, etc. among the converted filtered IMU data 154. In some examples, residuals are used as discrepancy metrics to determine IMU data consensus, and a residual may include a comparison of converted filtered IMU data (e.g., of a given IMU) to the mean converted filtered IMU data (e.g., from all IMUs being compared). For instance, in association with a given time (e.g., a selected timestamp), a mean of converted filtered gyro values in the z-axis for all of IMUs 122, 124, and 126 may be determined. Then, to determine the residual for a given IMU, the mean may be subtracted from the converted filtered gyro value in the z-axis for the given IMU. Similar residual determinations may be performed for the gyro data in any axis and the accelerometer data in any axis. In some examples, residual values that are relatively small (e.g., closer to zero) suggests consensus among the IMUs, whereas a larger residual value suggests there may not be consensus among the IMUs (e.g., there may be an error). For example, a residual for any given IMU may be compared to a residual threshold, and if the residual is larger than the threshold, then the given IMU may be deemed invalid (e.g., until some corrective measure is taken). In some examples, a maximum residual may be determined from among all residuals associated with a given time (e.g., a maximum residual from among all converted filtered z-axis gyro data associated with a given time), and if the maximum residual is larger than a residual threshold, the IMU associated with the maximum residual may be set as invalid (e.g., until some corrective measure is taken). In other words, in some examples, only the maximum residual is compared to the residual threshold. In at least some examples, consensus may be determined from a change in residual over time. For instance, where a high residual is associated with a valid consensus, a change of that residual which exceeds some threshold change may be associated with a consensus error.

A residual is an example of a discrepancy metric that may be used to assess consistency, and in other examples, different/additional discrepancy metrics or analysis may be considered by the consistency checker to assess consistency or variability among the converted filtered IMU data. For example, the consistency checker 158 may determine the differences between all IMU data samples for a given time period (e.g., the differences among all converted filtered z-axis gyro data associated with a given time). The consistency checker 158 may determine, from among all the differences, the largest difference and second largest difference. If the largest difference is greater than a threshold value, then the consistency checker 158 may determine whether a common IMU is associated with IMU data among the largest and second largest difference, and if so, the common IMU may be set as invalid.

Discrepancy metrics may be assessed in various manners. In at least some examples, data associated with a given axis (e.g., z-axis) is compared with other data associated with the given axis to assess consensus. This type of comparison may be performed for any of the axes (e.g., all of the axes), such as by applying some type of logical or operation. In some examples, a discrepancy threshold may be the same for each of the axes, or if an error in one of the axes is associated with a lower effect on downstream operations, then the discrepancy threshold associated with that axis may be larger (e.g., a higher discrepancy may not necessarily trigger an error or flag). In some examples, an error may be based on a combination of discrepancy metrics. For example, even if a discrepancy metric for a given axis is below a threshold, a lack of consensus may be determined where a combination of discrepancy metrics (e.g., summed) exceed a threshold. In some examples, the elements of FIG. 1 are associated with an order. For example, transformation by the data transformer 144 (e.g., to the same coordinate frame) may occur prior to filtering by the filter 148, and filtering may occur prior to assessing consistency by the consistency checker 158. However, examples of the present disclosure may include other orders of operations. For example, discrepancy between IMU data (e.g., as determined by the consistency checker) may be determined before the filter 148 filters the high-frequency data and low-frequency data, such as where the filter(s) is/are linear time invariant. In examples including a nonlinear filter (e.g., median filtering), then the discrepancy may be determined before the filtering. In addition, in some examples, the data transformer 144 may transform IMU data after the data has been filtered.

As described above, because the vehicle 102 includes redundant IMUs, one of the other, valid IMUs may still be used by subsequent processes and systems while corrective measures are taken for the invalid IMU. In addition, in accordance with examples, error detection may be performed using the safety-rated IMUs with software checks, and without needing to rely on other systems and/or hardware, which may or may not be safety rated. In this respect, achieving a safety rating associated with the multiple IMUs may be more easily accomplished, since the system need not also rely on the safety of other components. Furthermore, examples of the present disclosure may include three or more IMUs, which may reduce challenges associated with identifying which IMU is invalid. That is, in systems that include only two IMUs, errors may be detected (e.g., based on differentials), but it may be more challenging (e.g., as compared to a three-IMU system) to determine which IMU is invalid. Moreover, since noise and bias are reduced (e.g., based on filter parameters modeling such), these techniques may more accurately classify discrepancy as an error, as opposed to differences that might otherwise arise from the noise and/or bias.

Figure 2:
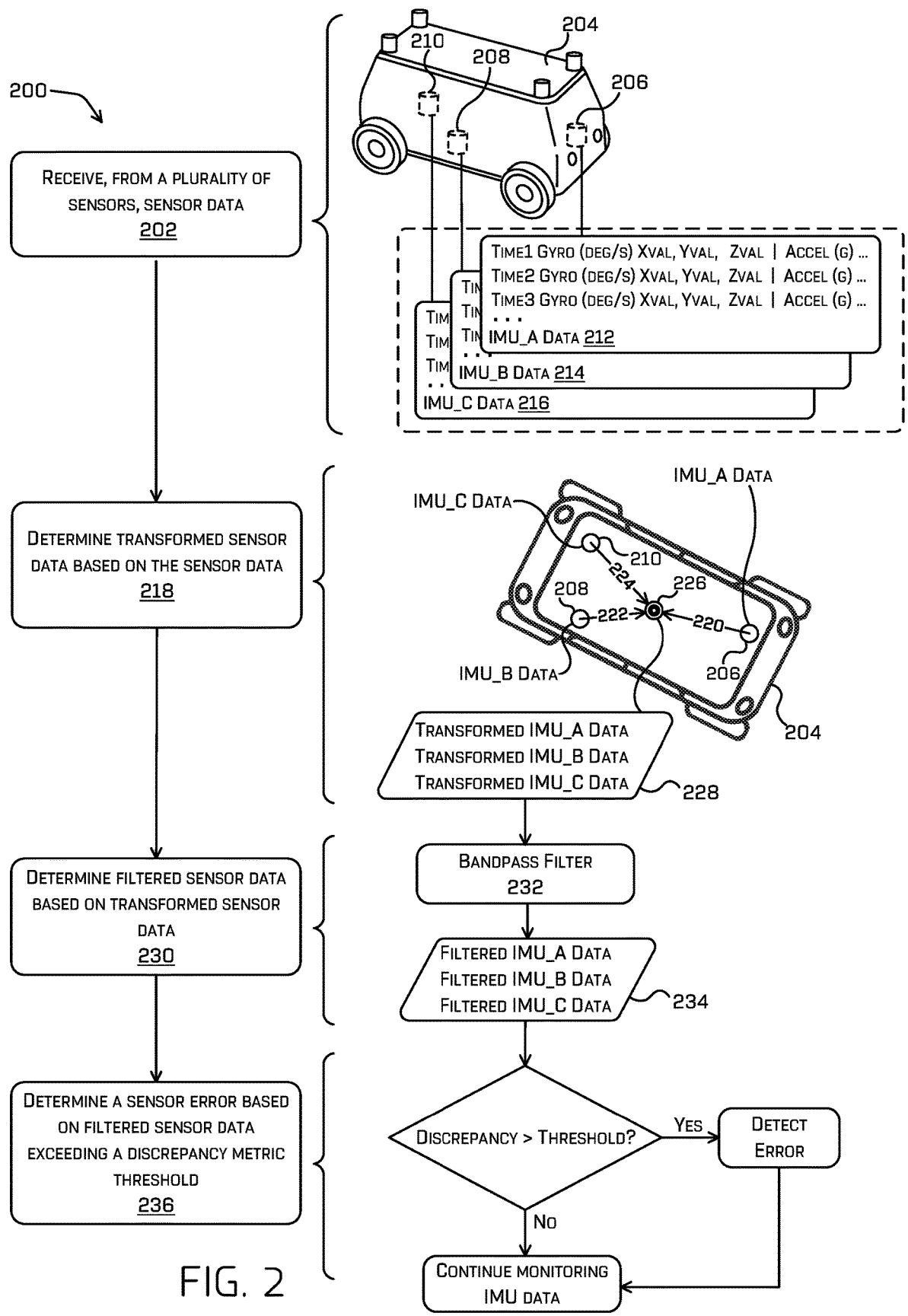
FIG. 2 includes a flow diagram illustrating an example process for monitoring consensus among IMUs, in accordance with examples of this disclosure.
Figure 3:
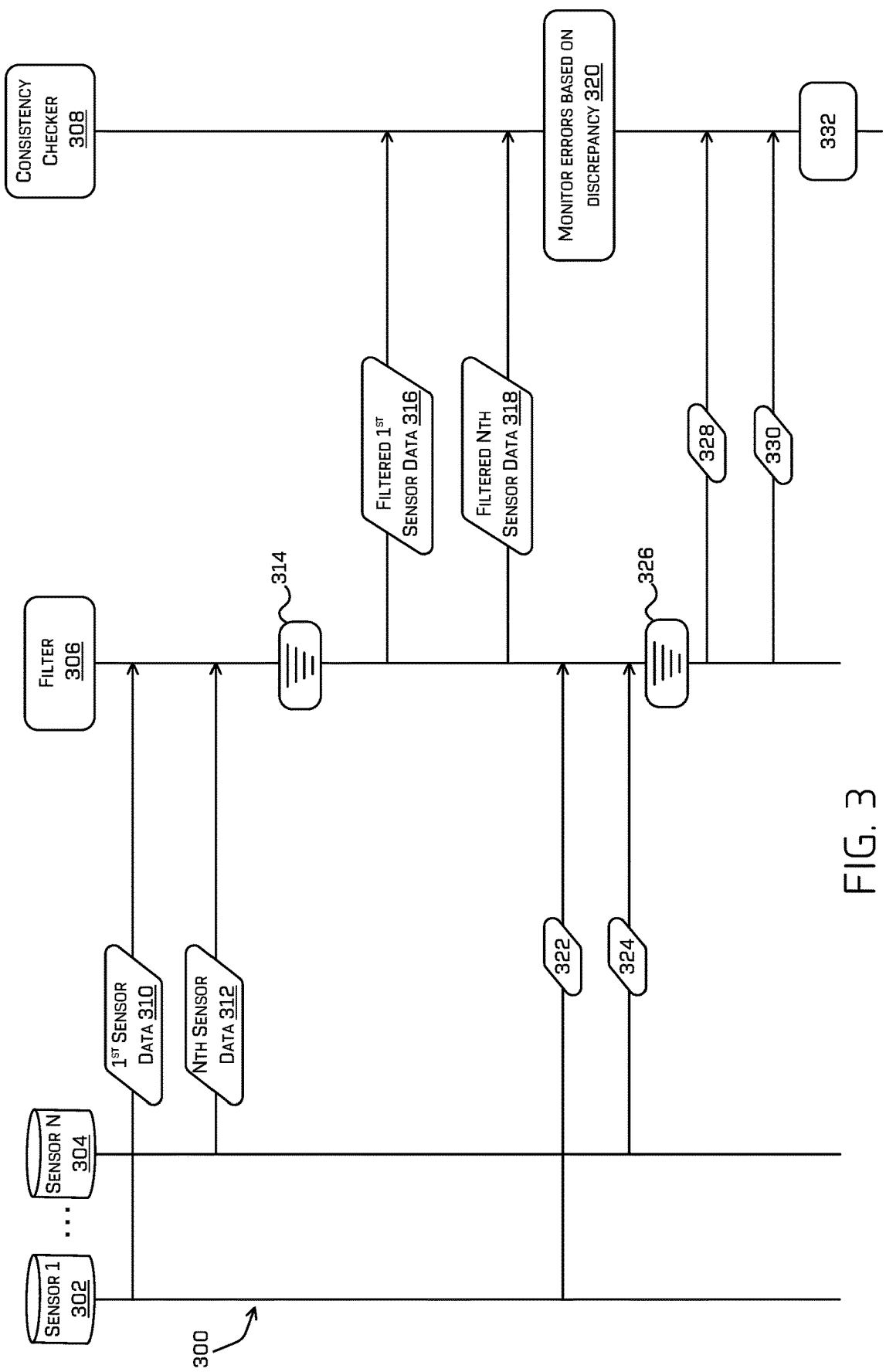
FIG. 3 includes a flow diagram illustrating an example process for monitoring consensus among sensors, in accordance with examples of this disclosure.

FIGS. 2 and 3 are flowcharts showing example processes involving techniques as described herein. The processes illustrated in FIGS. 2 and 3 may be described with reference to components and elements described above with reference to FIG. 1 for convenience and ease of understanding. In addition, the process in FIG. 2 may be described with respect to additional pictorials that are included in FIG. 2. However, the processes illustrated in FIGS. 2 and 3 are not limited to being performed using these components, and the components are not limited to performing the processes illustrated in FIGS. 2 and 3. The processes illustrated in FIGS. 2 and 3 are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the process.

FIG. 2 includes a flow diagram with operations or steps for a process 200 for determining consensus among IMUs of a vehicle, and at operation 202, the process 200 includes receiving, from a plurality of sensors, sensor data. For instance, FIG. 2 depicts, as an example, a vehicle 204 with an IMU A 206, an IMU B 208, and an IMU C 210, which may be similar (or identical) to the IMUs 122, 124, and 126. In addition, FIG. 2 depicts that the IMU A 206 generates IMU A data 212, the IMU B 208 generates IMU B data 214, and the IMU C 210 generates IMU C data 216. The IMU data 212, 214, and 216 may be similar to the IMU data 128, 130, and 132. For example, the IMU data 212, 214, and 216 may include sensor noise (e.g., high-frequency noise) and sensor bias (e.g., low-frequency bias).

At operation 218, the process 200 includes determining transformed sensor data based on the sensor data. For example, in association with the operation 218, FIG. 2 depicts a top-down view of the vehicle 204, including the IMUs 206, 208, and 210. In addition, FIG. 2 includes relative IMU data in association with the IMUs 206, 208, and 210. For example, IMU A 206 is associated with "IMU A Data." The other IMUs 208 and 210 are likewise associated with respective IMU data, including "IMU B Data" and "IMU C Data." In examples, the IMU data is associated with a same, or substantially the same, time (e.g., based on a same frequency between the IMUs, samples data, least common denominator, etc.). In addition, the IMU data is transformed (represented by arrows 220, 222, and 224) to a common point 226 of the vehicle 204, such as by applying a rigid body kinematics transformation, thereby generating transformed IMU data 228.

In some examples, the process 200 includes, at operation 230, determining filtered sensor data based on the transformed sensor data. For example, the transformed IMU data 228 may be filtered using a high-pass filter and/or a low-pass filter. That is, operation 230 may include two filtering operations, which may be performed one after the other (e.g., commutative in either order) or at the same time. In some examples, the transformed IMU data 228 may be filtered using a bandpass filter 232, which outputs filtered sensor data 234. The filtering at operation 230 may apply various strategies to model, and reduce the effect of, noise and bias included in the IMU data received in operation 202. In examples, operation 218 may include applying low-pass filtering parameters that reduce sensor noise (e.g., the values below a higher threshold are allowed to pass) and high-pass filtering parameters that reduce bias (e.g., the values above a lower threshold are allowed to pass). As such, in some examples, these techniques may increase the likelihood that subsequent analysis may accurately classify discrepancy among sensor data as errors (based on the detected signal), instead of detecting discrepancy that is potentially attributable to sensor noise and/or bias.

In addition, the process 200 includes, at operation 236, determining a sensor error based on the translated filtered sensor data exceeding a discrepancy metric threshold. For example, based on a mean of the filtered IMU data 234, residuals may be determined in association with the IMUs 206, 208, and 210, such as by subtracting the mean from the respective filtered IMU data. If a maximum residual is larger than a threshold metric, then an error may be flagged in association with the respective IMU. When an IMU is deemed invalid or in a fault state, various steps may be taken. For example, corrective action may be taken with respect to the identified IMU (e.g., calibration or recalibration). In addition, one or more of the other IMUs (e.g., not associated with the maximum residual) may be used, instead of the invalid IMU, to control operations of the vehicle. For example, the one or more other IMUs may be used to determine a relative position of the vehicle. In some examples, a weight associated with the faulty IMU may be lowered to reduce the influence of the data from the IMU on downstream processes, and in some instances, the weight may be reduced to zero. In some examples, an emergency stop may be performed until the issue is resolved. In some examples, the errors may be tracked over a given time period, and if the rate of errors for a given IMU or the number of errors within the given time period exceed a threshold, then the IMU may be flagged for service and/or replacement.

In examples, as depicted by the pictorials in FIG. 2, the consensus monitoring may loop back and continue to determine whether an error is detected in among the subsequent IMU time series data. For instance, in examples where the maximum residual is not larger than a threshold and in examples where the maximum residual is larger than the threshold, the process 200 may repeat to filter, translate, and determine the discrepancy among subsequent IMU data.

Referring now to FIG. 3, FIG. 3 includes a diagram with operations or steps for a process 300 for determining consensus among sensors. More specifically, FIG. 3 depicts communication of information between various components, including a first and Nth sensor 302 and 304 (e.g., two or more sensors), a filter 306, and a consistency checker 308. In addition, FIG. 3 depicts some operations that may be performed by the filter 306 and the consistency checker 308.

In FIG. 3, the sensors 302 and 304 generate respective sensor data 310 and 312, which may be transmitted to the filter 306 (e.g., filter 144 or 220). The sensors 302 and 304 may be IMUs, such as described with respect to FIGS. 1 and 2 and/or may be a variety of other types of sensors. For example, the sensors 302 and 304 may include gyroscopes, accelerometers, magnetometers, pressure sensors, and/or various Micro Electro-Mechanical Systems (MEMS). In examples, the data 310 and 312 is time series data (e.g., angular rate, force, or other motion determined in association with sequential times) that is continuously generated and fed to the other components for subsequent processing. As such, the sensor data 310 and 312 may include a combination of multiple determined values as they are iteratively compiled over time.

After receiving the sensor data 310 and 312, the filter 306 may perform various operations 314. For example, the filter 306 may transform the data 310 and 312 to a common coordinate frame (e.g., similar to the data transformer 144). In some examples, the filter 306 may perform any sampling or other operations to increase the likelihood that the data 310 and 312 is associated with a same time. In some examples, the filter 306 filters high-frequency data (e.g., noise) and filters low-frequency data (e.g., bias). For example, the filter 306 may include a low-pass filter, a high-pass filter, or a combination thereof, such as a bandpass filter. In some examples, the filter 306 may include one or more of an exponential filter, a finite impulse response filter, an infinite impulse response filter, an exponential decay filter, and the like. In examples, filtering the high-frequency data may include using a low-pass filter including one or more parameters configured to deemphasize sensor data representing sensor noise. In addition, filtering low-frequency data may include using a high-pass filter including one or more parameters configured to deemphasize sensor data representing sensor bias. These techniques may, among other things, apply filters that model sensor noise and sensor bias. As such, in some examples, these techniques may increase the likelihood that subsequent analysis may accurately classify discrepancy among sensor data as errors (based on the detected signal), instead of detecting discrepancy that is potentially attributable to sensor noise and/or bias.

In some examples, such as at startup, the filter 306 may start filtering the high-frequency data at a time earlier in the time series than the low-frequency data. That is, based on a time constant associated with the filter, the filter may delay for a duration (e.g., 0.8 seconds) before starting to filter the low-frequency data to allow time to receive a larger sample size, which may increase the likelihood that sensor bias is accurately modeled.

The filter 308 determines filtered first sensor data 316 associated with the first sensor data 310 and filtered Nth sensor data 318 associated with the Nth sensor data 312. As depicted in FIG. 3, the filtered sensor data 316 and 318 may be provided to subsequent components for processing. In some examples, the data 316 and 318 may be provided to the consistency checker 308.

In some examples, the consistency checker 308 may perform operations similar to the consistency checker 158 to monitor 320 errors based on a discrepancy among the data 316 and 318—that is, to determine whether there is consensus among the data. In examples, a lack of consistency among the data may indicate an error in one or more of the sensors. Monitoring for errors based on discrepancy may be determined in various ways, such as by determining a discrepancy metric or other value that quantifies the variability and/or differences among the data. In some examples, residuals are used as discrepancy metrics to monitor for errors. For example, a residual for any given sensor (or respective sensor data) may be compared to a residual threshold, and if the residual is larger than the threshold, then an error may be determined. In systems having two or fewer sensors, residuals exceeding a threshold may indicate an error and additional processing may be performed to determine which sensor may be invalid (e.g., where both residuals are the same). In systems with three or more sensors, the sensor with the highest residual exceeding a threshold may be deemed invalid (e.g., until some corrective measure is taken). That is, in some examples, a maximum residual may be determined from among all residuals associated with a given time in the time series, and if the maximum residual is larger than a residual threshold, the sensor associated with the maximum residual may be set as invalid (e.g., until some corrective measure is taken). In other examples, monitoring 320 may consider other discrepancy metrics, such as by considering which sensor is common to the largest differences among the respective data.

As indicated, various operations may be performed when an error is detected. For example, data associated with the invalid sensor may be relied on to a lesser extent (e.g., not relied on), until a corrective action is taken (e.g., recalibration). In addition, one of the other sensors may be used, instead of the invalid sensor, by downstream components. As such, examples described in this disclosure may provide, among other things, redundancy and error detection, which can contribute to safety associated with the sensors and/or other systems that consume the sensor data (e.g., vehicles). Furthermore, examples of the present disclosure include software-based monitoring that need not rely on operations from other components or systems, which may experience separate fault states or errors.

As described above with respect to FIG. 3, the sensor data may include data continuously determined over time. As such, examples of the present disclosure continuously monitor for errors. For example, as depicted in FIG. 3, after the data 310 and 312 is received, data 322 and 324 (e.g., associated with a subsequent time) may then be subsequently received and filtered 326. The filtered data 328 and 330 may then be compared 332 to assess consistency, and the monitoring may continue as additional sensor data is subsequently received.

Figure 4:
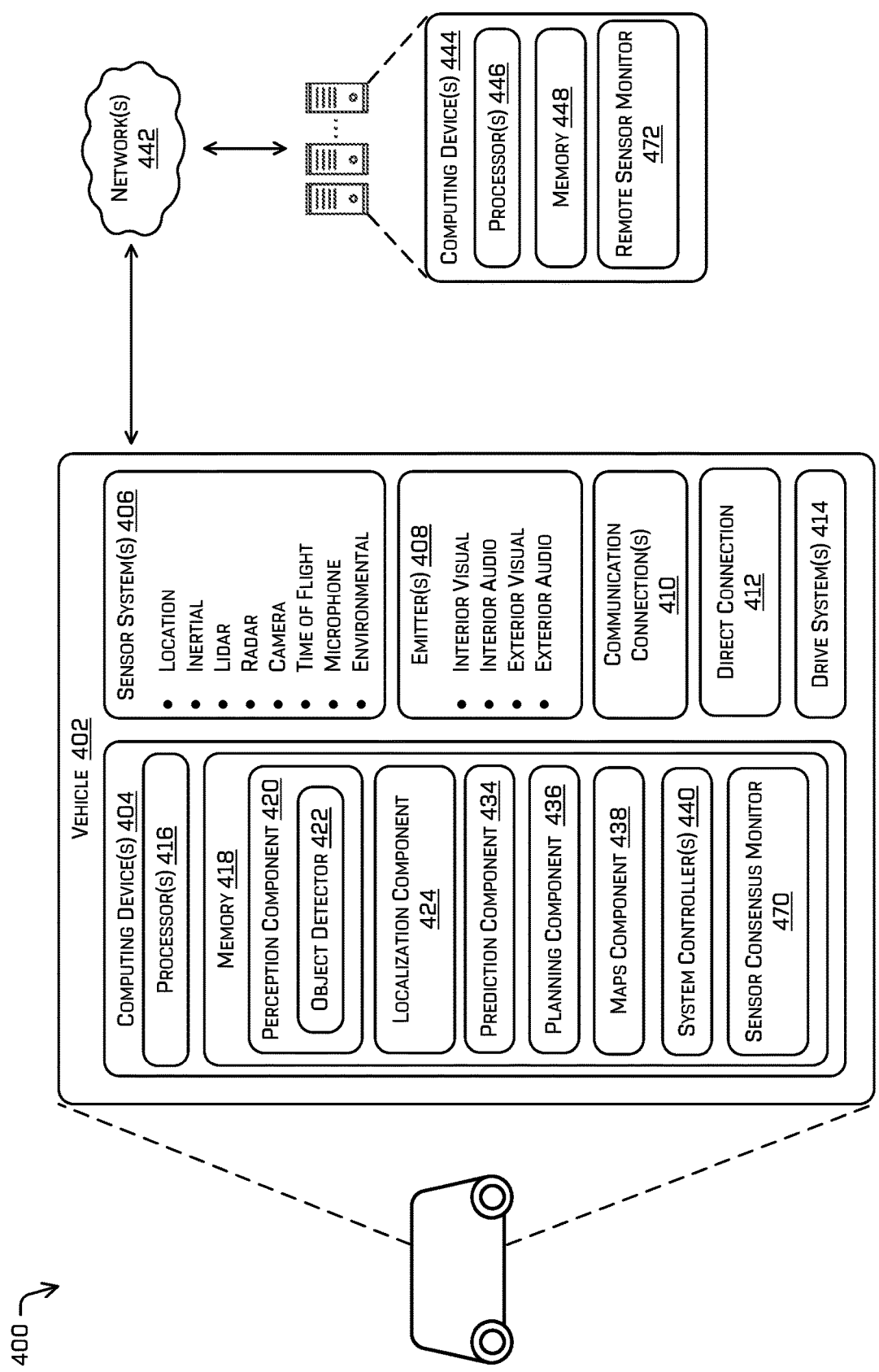
FIG. 4 is a block diagram illustrating an example system for performing techniques as described herein.

Referring now to FIG. 4, FIG. 4 depicts a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle. The vehicle 402 may be the vehicle 102 depicted in FIG. 1 and/or the vehicle 204 in FIG. 2 and may be configured to perform various operations that monitor a consensus among sensors (e.g., IMUs).

The vehicle 402 can be a driverless vehicle, such as an autonomous vehicle configured to operate according to a Level 4 classification issued by the U.S. National Highway Traffic Safety Administration, which describes a vehicle capable of performing all safety critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled. In some examples, the vehicle 402 (e.g., systems and/or components of the vehicle 402) may be associated with safety ratings, and examples of the present disclosure that detect errors may increase a likelihood that the vehicle complies with safety guidelines.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404. The one or more sensor system(s) 406 may include the IMUs 122, 124, and 126.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., charging station, a remote teleoperation computing device, etc.) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, battery charging components, a motor to propel the vehicle, power electronics, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a perception component 420, a localization component 424, a prediction component 434, a planning component 436, a maps component 438, and one or more system controller(s) 440. In addition, the memory 418 may store a sensor consensus monitor 470. Though depicted as residing in the memory 418 for illustrative purposes, it is contemplated that the perception component 420, the localization component 424, the prediction component 434, the planning component 436, the maps component 438, and the one or more system controller(s) 440 can additionally, or alternatively, be accessible to the computing device 404 (e.g., stored in a different component of vehicle 402) and/or be accessible to the vehicle 402 (e.g., stored remotely).

The perception component 420 can include functionality to perform object detection, segmentation, and/or classification. In some examples, the perception component 420 and/or the object detector 422 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 420 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 420 can include functionality to store perception data generated by the perception component 420. In some instances, the perception component 420 can determine a track corresponding to an object that has been classified as an object type. For purposes of illustration only, the perception component 420, using sensor system(s) 406 can capture one or more images of an environment, which may be used to determine information about an environment.

The stored perception data can, in some examples, include fused perception data captured by the vehicle. Fused perception data can include a fusion or other combination of sensor data from sensor system(s) 406, such as image sensors, lidar sensors, radar sensors, time of flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 422 can detect (among other things) semantic objects represented by sensor data. In some examples, the object detector 422 can identify such semantic objects and can determine a two-dimensional or a three-dimensional bounding box associated with the object. The object detector 422 can determine additional information such as a location, orientation, pose, and/or size (e.g., length, width, height, etc.) associated with the object. The object detector 422 can send data to other components of the system 400 for localization and/or determining calibration information, as discussed herein.

The localization component 424 can include functionality to receive data from the sensor system(s) 406 and/or other components to determine a position of the vehicle 402. For example, the localization component 424 can include and/or request/receive a three-dimensional map of an environment and can continuously determine a location of the autonomous vehicle within the map. In some instances, the localization component 424 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 424 can provide data to various components of the vehicle 402 to determine an initial position of an autonomous vehicle for generating a trajectory or for initial calibration.

In some examples, a source of information received by the localization component 424 may depend on operations of the sensor consensus monitor 470. That is, the sensor consensus monitor 470 may perform at least some of the operations described with respect to FIGS. 1, 2, and 3, such as receiving sensor data (e.g., IMU data), filtering the sensor data, translating the filtered sensor data to a common frame, and determining consensus among the data (e.g., based on discrepancy). As such, the sensor consensus monitor 470 may analyze sensor data for errors before the sensor data is provided to the localization component 424, and when an error is detected, data from a valid sensor may be provided to the localization component 424.

The prediction component 434 can generate one or more probability maps representing prediction probabilities of possible locations of one or more objects in an environment. For example, the prediction component 434 can generate one or more probability maps for vehicles, pedestrians, animals, and the like within a threshold distance from the vehicle 402. In some instances, the prediction component 434 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 436 can determine a path for the vehicle 402 to follow to traverse through an environment. For example, the planning component 436 can determine various routes and paths and various levels of detail. In some instances, the planning component 436 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 436 can alternatively, or additionally, use data from the perception component 420 and/or the prediction component 434 to determine a path for the vehicle 402 to follow to traverse through an environment. For example, the planning component 436 can receive data from the perception component 420 and/or the prediction component 434 regarding objects associated with an environment. Using this data, the planning component 436 can determine a route to travel from a first location (e.g., a current location) to a second location (e.g., a target location) to avoid objects in an environment. In at least some examples, such a planning component 436 may determine there is no such collision free path and, in turn, provide a path which brings vehicle 402 to a safe stop avoiding all collisions and/or otherwise mitigating damage.

The memory 418 can further include one or more maps associated with a maps component 438 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps from the map(s) component 438 can include at least one map (e.g., images and/or a mesh). In some examples, the vehicle 402 can be controlled based at least in part on the map(s) component 438. That is, the map(s) component 438 can be used in connection with the perception component 420 (and sub-components), the localization component 424 (and sub-components), the prediction component 434, and/or the planning component 436 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 can include one or more system controller(s) 440, which can be configured to control steering, propulsion, braking, safety, emitters, communication, and other systems of the vehicle 402. These system controller(s) 440 can communicate with and/or control corresponding systems of the drive system(s) 414 and/or other components of the vehicle 402, which may be configured to operate in accordance with a path provided from the planning component 436.

The vehicle 402 can connect to computing device(s) 444 via network 442, and the computing device(s) may include one or more processor(s) 446 and memory 448 communicatively coupled with the one or more processor(s) 446. In at least one instance, the one or more processor(s) 446 can be similar to the processor(s) 416 and the memory 448 can be similar to the memory 418. In at least one example, the computing device(s) 444 may include a remote diagnostic tool configured to detect sensor errors associated with the vehicle 402. For example, the computing device(s) 444 may include a remote sensor monitor 472 that can remotely perform operations similar to the sensor consensus monitor 470.

The processor(s) 416 of the computing device 404 and the processor(s) 446 of the computing device(s) 444 can be any suitable processor capable of executing instructions to process data and perform operations as described herein. By way of example and not limitation, the processor(s) 416 and 446 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 computing device 404 and the memory 448 of the computing device(s) 444 are examples of non-transitory computer-readable media. The memory 418 and 448 can store an operating system and one or more software applications, instructions, programs, and/or data to implement the methods described herein and the functions attributed to the various systems. In various implementations, the memory 418 and 448 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 418 and 448 can be implemented as a neural network. In some examples a machine learned model could be trained for object detection or trajectory planning for parking in position to align coils. In some examples, a model could be trained to detect faults or to predict which faults are associated with which active constraints. For example, the model may be trained with training data include constraints labeled with ground truth faults. Furthermore, in some examples, sample data may include many (e.g. hundreds of, thousands of, millions of, etc.) example constraints with the fault(s) deemed to have caused the constraints, and the most common fault(s) associated with a given constraint may be determined and referenced to determine a most-likely fault.

As described herein, an exemplary neural network is a biologically inspired algorithm which passes input data through a series of connected layers to produce an output. Any layers in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet40, ResNet101, VGG, DenseNet, PointNet, and the like.

As described above with reference to FIGS. 1-4, techniques described herein can be useful for monitoring for sensor errors. More specifically, these techniques may, among other things, apply filters that model sensor noise and sensor bias, and as such, these techniques can accurately classify discrepancy among sensor data as errors (based on the detected signal), instead of detecting discrepancy that is potentially attributable to sensor noise and/or bias.

EXAMPLE CLAUSES

A: An autonomous vehicle comprising: a first inertial measurement unit (IMU), a second IMU, and a third IMU; one or more processors; and one or more computer-readable media storing instructions that, when executed by the one or more processors, cause the autonomous vehicle to perform operations comprising: receiving first sensor data generated by the first IMU, second sensor data generated by the second IMU, and third sensor data generated by the third IMU; determining, by transformation to a reference point associated with the autonomous vehicle, first transformed sensor data based on the first sensor data, second transformed sensor data based on the second sensor data, and third transformed sensor data based on the third sensor data; determining, by filtering high-frequency data and low-frequency data, first filtered sensor data based on the first transformed sensor data, second filtered sensor data based on the second transformed sensor data, and third filtered sensor data based on the third transformed sensor data; determining, based at least in part on a comparison of the first filtered sensor data to the second filtered sensor data and to the third filtered sensor data, a discrepancy metric associated with the first filtered sensor data; determining, based at least in part on the discrepancy metric exceeding a threshold metric, an error associated with the first IMU; using, based at least in part on the error associated with the first IMU, the second sensor data instead of the first sensor data to determine a relative position of the autonomous vehicle; and controlling, based at least in part on the relative position, an operation of the autonomous vehicle.

B: The autonomous vehicle of paragraph A, wherein: the high-frequency data corresponds at least in part to sensor noise; and the low-frequency data corresponds at least in part to sensor bias.

C: The autonomous vehicle of either paragraph A or B, wherein one or more of the first filtered sensor data, the second filtered sensor data, or the third filtered sensor data is determined based on a low-pass filter and a high-pass filter or based on a bandpass filter.

D: The autonomous vehicle of any one of paragraphs A—C, wherein the discrepancy metric includes a maximum residual associated with the first filtered sensor data.

E: The autonomous vehicle of any one of paragraphs A—D, wherein: the discrepancy metric includes a largest difference between at least the first filtered sensor data associated with an axis of the autonomous vehicle, the second filtered sensor data associated with the axis of the autonomous vehicle, and the third filtered sensor data associated with the axis of the autonomous vehicle; and the operations further comprise: determining a second largest difference between at least the first filtered sensor data, the second filtered sensor data, and the third filtered sensor data; and the second sensor data is used to determine the relative position based at least in part on the first filtered sensor data being associated with the largest difference and the second largest difference.

F: A method comprising: receiving first sensor data associated with a first sensor and second sensor data associated with a second sensor; determining third sensor data by filtering high-frequency data and low-frequency data from the first sensor data and the second sensor data; determining, based at least in part on the third sensor data, a discrepancy metric associated with the first sensor; determining, based at least in part on the discrepancy metric exceeding a threshold metric, an error associated with the first sensor; and using, based at least in part on the error associated with the first sensor, the second sensor data instead of the first sensor data to control an operation of a vehicle.

G: The method of paragraph F, wherein the first sensor and the second sensor include gyroscopes, accelerometers, pressure sensors, magnetometers, IMUs, or any combination thereof H: The method of either paragraph F or G further comprising: receiving fourth sensor data associated with the first sensor, wherein the fourth sensor data is received prior to the first sensor data; and controlling, based on the fourth sensor data, a second operation of the vehicle before the operation, wherein the operation includes recalibrating the first sensor.

I: The method of any one of paragraphs F-H, wherein: filtering high-frequency data includes using a low-pass filter including one or more parameters configured to devalue sensor data corresponding at least in part to sensor noise; and the low-pass filter includes one or more of: an exponential filter, a finite impulse response filter, an infinite impulse response filter, or an exponential decay filter.

J: The method of any one of paragraphs F-I, wherein: filtering low-frequency data includes using a high-pass filter including one or more parameters configured to devalue sensor data corresponding at least in part to sensor bias; and the high-pass filter includes one or more of: an exponential filter, a finite impulse response filter, an infinite impulse response filter, or an exponential decay filter.

K: The method of any one of paragraphs F-J, wherein the discrepancy metric includes a first residual that is associated with the first sensor and that is higher than a second residual associated with the second sensor.

L: The method of any one of paragraphs F-K, wherein: the first sensor and the second sensor include a first IMU and a second IMU associated with respective positions relative to the vehicle; the method further comprises: determining, by transformation to a reference point associated with the vehicle, transformed sensor data based on the first sensor data and the second sensor data; and the discrepancy metric is based on the transformed sensor data.

M: The method of any one of paragraphs F-L, wherein: the first sensor data and the second sensor data include time series data; and the method further comprises beginning to filter the high-frequency data at an earlier time in the time series data than a later time at which beginning to filter the low-frequency data.

N: One or more non-transitory computer-readable media storing instructions that, when executed, cause one or more processors to perform operations comprising: receive first sensor data associated with a first sensor and second sensor data associated with a second sensor; determine third sensor data by filtering high-frequency data and low-frequency data from the first sensor data and the second sensor data; determine, based at least in part on the third sensor data, a discrepancy metric associated with the first sensor; determine, based at least in part on the discrepancy metric exceeding a threshold metric, an error associated with the first sensor; and use, based at least in part on the error associated with the first sensor, the second sensor data instead of the first sensor data to control an operation of a vehicle.

O: The one or more non-transitory computer-readable media of paragraph N, wherein the first sensor and the second sensor include gyroscopes, accelerometers, pressure sensors, magnetometers, IMUs, or any combination thereof P: The one or more non-transitory computer-readable media of either paragraph N or O, wherein operations further comprise: receiving fourth sensor data associated with the first sensor, wherein the fourth sensor data is received prior to the first sensor data; and controlling, based at least in part on the fourth sensor data, a second operation of the vehicle before the operation; and changing, based at least in part on the error associated with the first sensor, from controlling the vehicle based on data generated by the first sensor to controlling the vehicle based on data generated by the second sensor.

Q: The one or more non-transitory computer-readable media of any one of paragraphs N-P, wherein: filtering high-frequency data includes using a low-pass filter including one or more parameters configured to devalue sensor data corresponding at least in part to sensor noise; filtering low-frequency data includes using a high-pass filter including one or more parameters configured to devalue sensor data corresponding at least in part to sensor bias; and the low-pass filter and the high-pass filter comprise one or more of: an exponential filter, a finite impulse response filter, an infinite impulse response filter, an exponential decay filter, or a median filter.

R: The one or more non-transitory computer-readable media of any one of paragraphs N-Q, wherein the discrepancy metric includes a first residual that is associated with the first sensor and that is higher than a second residual associated with the second sensor.

S: The one or more non-transitory computer-readable media of any one of paragraphs N-R, wherein: the first sensor and the second sensor include a first IMU and a second IMU associated with respective positions relative to the vehicle; the operations further comprise determining, by transformation to a reference point associated with the vehicle, transformed sensor data based on the first sensor data and the second sensor data; and the discrepancy metric is based on the transformed sensor data.

T: The one or more non-transitory computer-readable media of any one of paragraphs N-S, wherein: the first sensor data and the second sensor data include time series data; and the operations further comprise beginning to filter the high-frequency data at an earlier time in the time series data than a later time at which beginning to filter the low-frequency data.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving first sensor data associated with a first sensor and second sensor data associated with a second sensor;
determining third sensor data by filtering high-frequency data and low-frequency data from the first sensor data and the second sensor data;
determining, based at least in part on the third sensor data, a discrepancy metric associated with the first sensor;
determining, based at least in part on the discrepancy metric exceeding a threshold metric, an error associated with the first sensor; and
using, based at least in part on the error associated with the first sensor, the second sensor data instead of the first sensor data to control an operation of a vehicle.

2. The method of claim 1, wherein the first sensor and the second sensor include gyroscopes, accelerometers, pressure sensors, magnetometers, inertial measurement units, or any combination thereof.

3. The method of claim 1 further comprising:
receiving fourth sensor data associated with the first sensor, wherein the fourth sensor data is received prior to the first sensor data; and
controlling, based on the fourth sensor data, a second operation of the vehicle before the operation, wherein the operation includes recalibrating the first sensor.

4. The method of claim 1, wherein:
the filtering of high-frequency data includes using a low-pass filter including one or more parameters configured to devalue sensor data corresponding at least in part to sensor noise; and
the low-pass filter includes one or more of:
an exponential filter,
a finite impulse response filter,
an infinite impulse response filter, or
an exponential decay filter.

5. The method of claim 1, wherein:
the filtering of low-frequency data includes using a high-pass filter including one or more parameters configured to devalue sensor data corresponding at least in part to sensor bias; and
the high-pass filter includes one or more of:
an exponential filter,
a finite impulse response filter,
an infinite impulse response filter, or
an exponential decay filter.

6. The method of claim 1, wherein the discrepancy metric includes a first residual that is associated with the first sensor and that is higher than a second residual associated with the second sensor.

7. The method of claim 1, wherein:
the first sensor and the second sensor include a first inertial measurement unit (IMU) and a second IMU associated with respective positions relative to the vehicle;
the method further comprises:
determining, by transformation to a reference point associated with the vehicle, transformed sensor data based on the first sensor data and the second sensor data; and
the discrepancy metric is based on the transformed sensor data.

8. The method of claim 1, wherein:
the first sensor data and the second sensor data include time series data; and
the method further comprises beginning to filter the high-frequency data at an earlier time in the time series data than a later time at which beginning to filter the low-frequency data.

9. One or more non-transitory computer-readable media storing instructions that, when executed, cause one or more processors to perform operations comprising:
receive first sensor data associated with a first sensor and second sensor data associated with a second sensor;
determine third sensor data by filtering high-frequency data and low-frequency data from the first sensor data and the second sensor data;
determine, based at least in part on the third sensor data, a discrepancy metric associated with the first sensor;
determine, based at least in part on the discrepancy metric exceeding a threshold metric, an error associated with the first sensor; and
use, based at least in part on the error associated with the first sensor, the second sensor data instead of the first sensor data to control an operation of a vehicle.

10. The one or more non-transitory computer-readable media of claim 9, wherein the first sensor and the second sensor include gyroscopes, accelerometers, pressure sensors, magnetometers, inertial measurement units, or any combination thereof.

11. The one or more non-transitory computer-readable media of claim 9, wherein operations further comprise:
receiving fourth sensor data associated with the first sensor, wherein the fourth sensor data is received prior to the first sensor data; and
controlling, based at least in part on the fourth sensor data, a second operation of the vehicle before the operation; and
changing, based at least in part on the error associated with the first sensor, from controlling the vehicle based on data generated by the first sensor to controlling the vehicle based on data generated by the second sensor.

12. The one or more non-transitory computer-readable media of claim 9, wherein:
the filtering of high-frequency data includes using a low-pass filter including one or more parameters configured to devalue sensor data corresponding at least in part to sensor noise;
the filtering of low-frequency data includes using a high-pass filter including one or more parameters configured to devalue sensor data corresponding at least in part to sensor bias; and
the low-pass filter and the high-pass filter comprise one or more of:
an exponential filter,
a finite impulse response filter,
an infinite impulse response filter,
an exponential decay filter, or
a median filter.

13. The one or more non-transitory computer-readable media of claim 9, wherein the discrepancy metric includes a first residual that is associated with the first sensor and that is higher than a second residual associated with the second sensor.

14. The one or more non-transitory computer-readable media of claim 9, wherein:
the first sensor and the second sensor include a first inertial measurement unit and a second IMU associated with respective positions relative to the vehicle;
the operations further comprise determining, by transformation to a reference point associated with the vehicle, transformed sensor data based on the first sensor data and the second sensor data; and
the discrepancy metric is based on the transformed sensor data.

15. The one or more non-transitory computer-readable media of claim 9, wherein:
the first sensor data and the second sensor data include time series data; and
the operations further comprise beginning to filter the high-frequency data at an earlier time in the time series data than a later time at which beginning to filter the low-frequency data.

16. An autonomous vehicle comprising:
a first sensor and a second sensor;
one or more processors; and one or more computer-readable media storing instructions that, when executed by the one or more processors, cause the autonomous vehicle to perform operations comprising:

receiving first sensor data associated with the first sensor and second sensor data associated with the second sensor;

determining third sensor data by filtering high-frequency data and low-frequency data from the first sensor data and the second sensor data;

determining, based at least in part on the third sensor data, a discrepancy metric associated with the first sensor;

determining, based at least in part on the discrepancy metric exceeding a threshold metric, an error associated with the first sensor; and using, based at least in part on the error associated with the first sensor, the second sensor data instead of the first sensor data to control of the autonomous vehicle.

17. The autonomous vehicle of claim 16, wherein:

the filtering of high-frequency data includes using a low-pass filter including one or more parameters configured to devalue sensor data corresponding at least in part to sensor noise;

the filtering of low-frequency data includes using a high-pass filter including one or more parameters configured to devalue sensor data corresponding at least in part to sensor bias; and the low-pass filter and the high-pass filter comprise one or more of:

an exponential filter,
a finite impulse response filter,
an infinite impulse response filter,
an exponential decay filter, or
a median filter.

18. The autonomous vehicle of claim 16, wherein the discrepancy metric includes a first residual that is associated with the first sensor and that is higher than a second residual associated with the second sensor.

19. The autonomous vehicle of claim 16, wherein:

the first sensor data and the second sensor data include time series data; and the operations further comprises beginning to filter the high-frequency data at an earlier time in the time series data than a later time at which beginning to filter the low-frequency data.

20. The method of claim 1, wherein:

the first sensor and the second sensor include a first inertial measurement unit and a second IMU associated with respective positions relative to the vehicle, the method further comprises:

receiving fourth sensor data associated with a third IMU;

determining, by transformation to a reference point associated with the vehicle, transformed sensor data based on the first sensor data, the second sensor data, and the fourth sensor data; and the discrepancy metric is based on the transformed sensor data.

* * * * *